(No Model.)  3 Sheets—Sheet 1.
E. T. STARR.
BATTERY ELECTRODE OR ELEMENT.
No. 295,889. Patented Mar. 25, 1884.
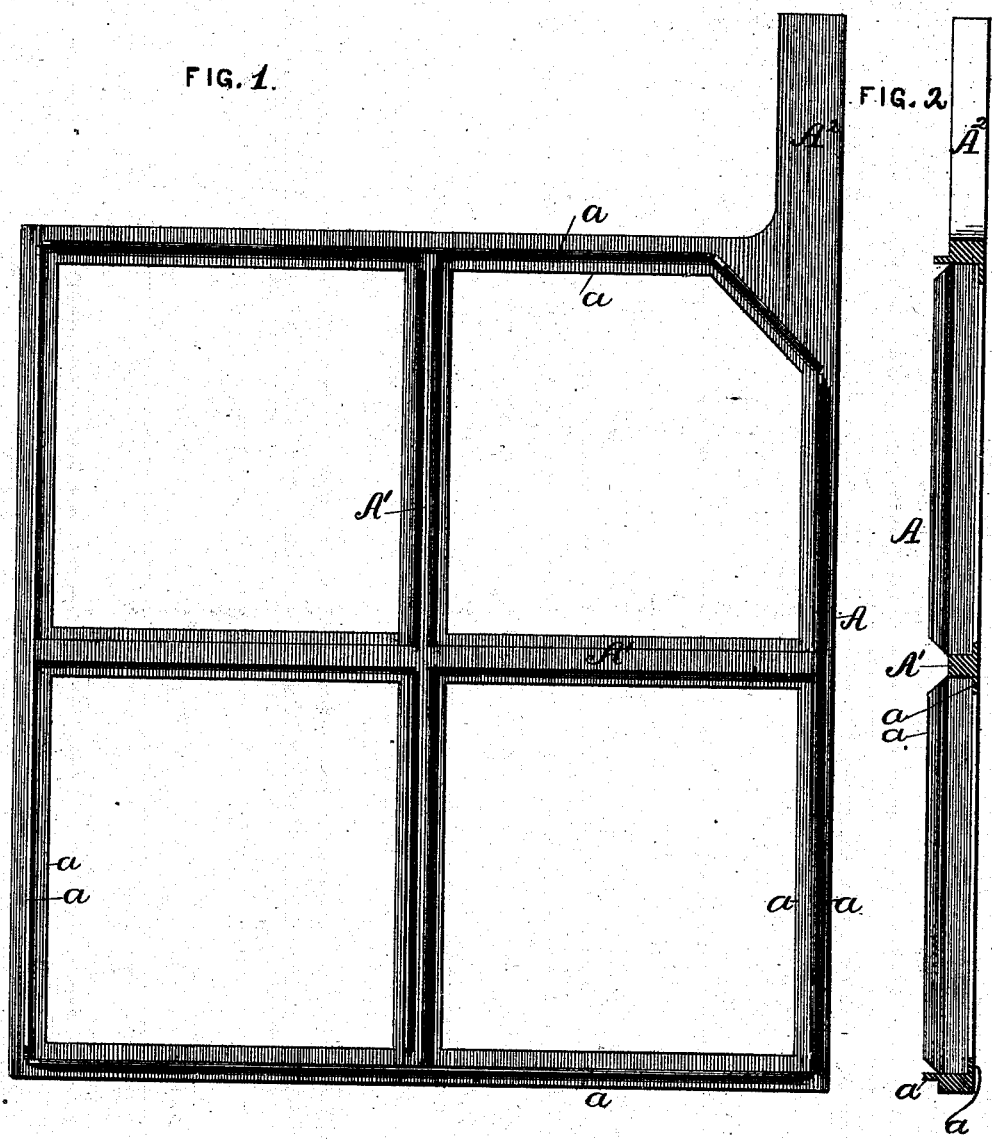
WITNESSES:
James Young.
Eugene V. Brown.
INVENTOR:
Eli T. Starr,
by his atty Wm J. Peyton.

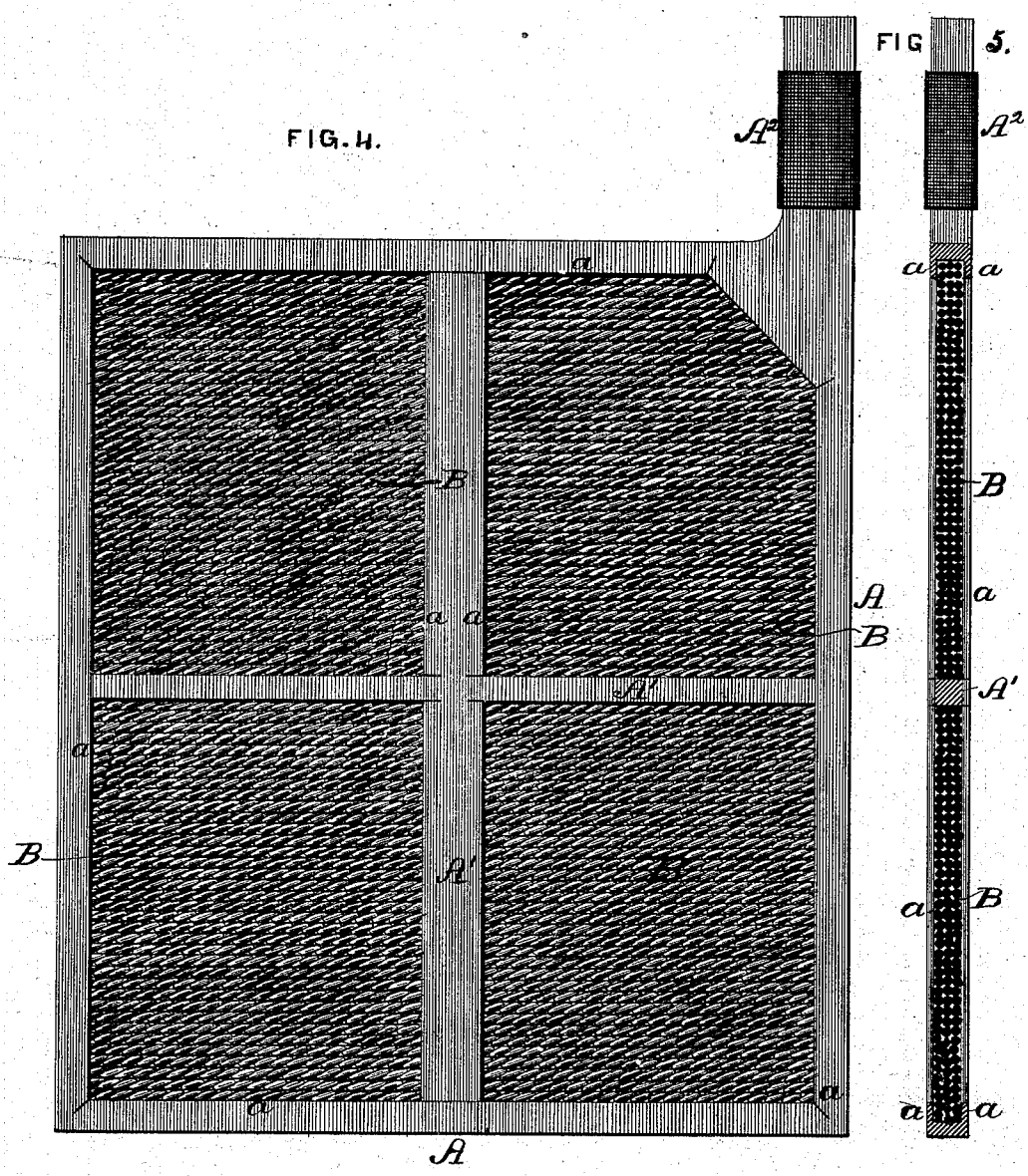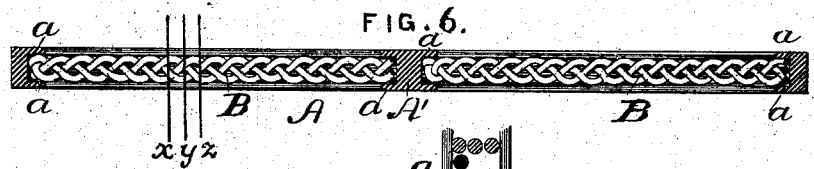

(No Model.)
E. T. STARR.
BATTERY ELECTRODE OR ELEMENT.
No. 295,889. Patented Mar. 25, 1884.
3 Sheets—Sheet 3.
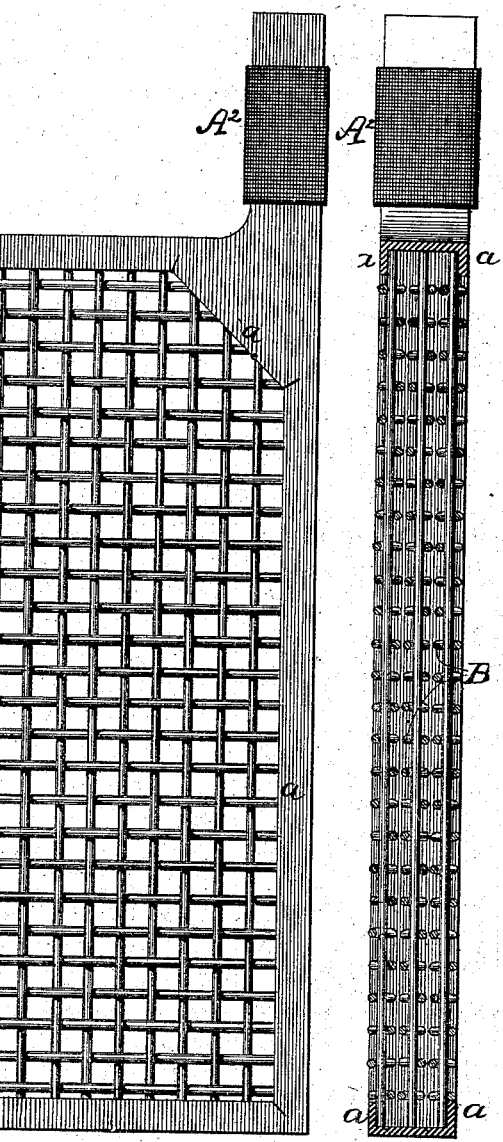
FIG. 8.
FIG. 9.
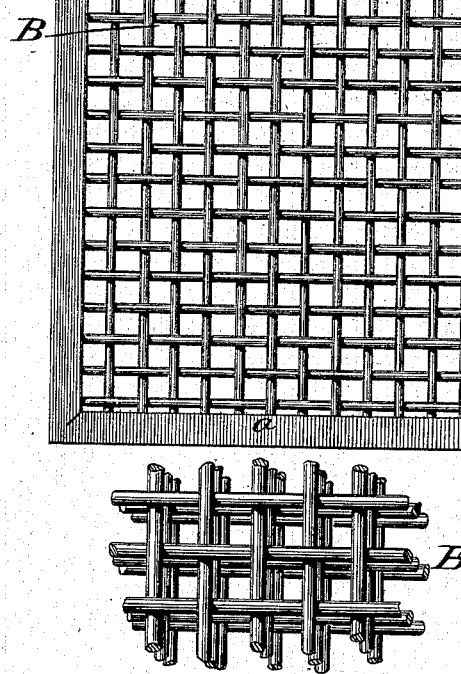
FIG. 10.
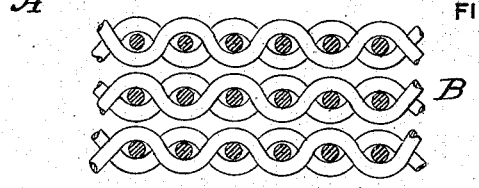
FIG. 12.   FIG. 11.
WITNESSES:
James Young.
Eugene V. Brown.
INVENTOR:
Eli T. Starr,
by his atty Wm S. Peyton

United States Patent Office.

ELI T. STARR, OF PHILADELPHIA, PENNSYLVANIA, ASSIGNOR OF ONE-HALF TO H. M. LEWIS AND JAMES W. WHITE, BOTH OF SAME PLACE, AND WILLIAM J. PEYTON, OF WASHINGTON, DISTRICT OF COLUMBIA.

BATTERY ELECTRODE OR ELEMENT.

SPECIFICATION forming part of Letters Patent No. 295,889, dated March 25, 1884.

Application filed October 30, 1883. (No model.)

*To all whom it may concern:*

Be it known that I, ELI T. STARR, of the city and county of Philadelphia, in the State of Pennsylvania, have invented certain new and useful Improvements in Battery Electrodes or Elements, of which the following is a specification.

My invention relates more especially to electrodes for secondary batteries; and its objects are to provide an electrode which is very efficient by reason of the exposure of large surface to chemical action and the free circulation of the electrolyte, is comparatively light and strong, is very durable considering the extent of surfaces exposed and the light weight of the electrode, and which may be comparatively cheaply manufactured.

The subject-matter claimed is first described in detail as organized in the best way now known to me, and is then particularly pointed out at the close of the specification.

In the accompanying drawings, Figure 1 is a view in elevation of one of the flanged open-sided frames of my improved electrode. Fig. 2 is a vertical section therethrough, and Fig. 3 is a horizontal section through said frame. Fig. 4 is a view of the completed electrode ready to be "formed" or put into condition to generate electricity; and Fig. 5 is a vertical section therethrough, showing the ends of the wire plait or braid as joined or united together where they are overlapped by the flanges of the frame. Fig. 6 is a horizontal section through the electrode; and Fig. 7 is a section taken diagonally through a portion of the electrode on the lines *x y z* of Fig. 6, showing the interstices or openings which exist in the body of the electrode for the free circulation of the battery fluid. Fig. 8 is an elevation of a modified form of the improved electrode, and Fig. 9 is a vertical section therethrough. Fig. 10 is a view in perspective of the interlaced or woven fabric preferably employed in the form of electrode shown in Figs. 8 and 9; and Figs. 11 and 12 are sectional views (plans) of a portion of the fabric, the former showing the several sheets or plates of the fabric as slightly separated and the latter as fitted close together.

In constructing my improved electrode, I take an open-sided frame, A, which is grooved or provided with flanges *a a* at the front and rear sides of the frame, to receive the main or body portion B of the electrode or element. This body portion consists of metallic wires interlaced or woven into a fabric. The wire is preferably round wire, and made of lead, and is preferably interlaced or woven into a substantially flat plaited or braided form, (shown in Figs. 4 to 7, inclusive,) or into the sieve or net form shown in Figs. 8 to 12, inclusive.

The frame A is shown in Figs. 1 to 7, inclusive, as divided by strengthening braces, bars, or partitions A', and these bars, like the inner sides of the main portion of the frame, are grooved or provided with flanges *a a*, to receive the interlaced or woven wire.

In Figs. 4 to 7, inclusive, the wire is first plaited or formed into a braid or ribbon (preferably of three strands of wire) having interstices all through it. The plaited or braided wire may be cut into strips of the proper length, and laid, packed, or folded into the frame or its compartments, or each compartment, when such are used, may be filled by a continuous strip of the braided wire by properly bending or folding the strip upon itself. After the frame A has been filled with the braided or plaited wire the ends of the wires are united together and to the frame, preferably by what is known in the art as "burning," or by melting them together, or by the use of solder, and in addition the flanges of said frame are bent or closed over upon the wire and firmly united thereto around its edges by burning or otherwise.

By the construction described a strong electrode or element is produced having excellent conductivity, while, as is obvious, it presents enormous surface to the chemical action which takes place in the cell. Further than this, the electrode permits free circulation and access of the electrolyte to all parts thereof, which is very important. By reason, also, of employing round or equivalent wires, the electrode is rendered very durable, it requiring a long time of service to entirely oxidize the wires through and through. Furthermore, the electrode possesses excellent conductivity by reason of the use of drawn metal, of which the wire is composed. The use of cast metal therefore to obtain extensive surface is avoided. Finally, by the employment of interlaced or woven wire, good conductivity is always obtained over the whole surface of the electrode or body portion thereof, as the wires are in contact, and in addition to this each wire is free to yield to expansion or contraction at all points without communicating its movement to the balance of the electrode, while there is no danger of the separation of the wires or bending thereof, which would be the case with wires merely extending across a frame, but not interlaced or woven together, which has heretofore been suggested, woven wire having also been heretofore suggested, but not in the form of a series of substantially flat layers or folds placed broadside one above or upon another in an open-sided frame, as described by me.

The surrounding or supporting frame A of the electrode may be either cast or rolled, stamped or forged up into shape. I prefer the latter to casting the frame.

In Fig. 7 I have shown a section through the electrode taken diagonally through a portion thereof, which graphically illustrates the numerous interstices or spaces through it, which permit free access and circulation of the electrolytic fluid, usually dilute sulphuric acid.

In the form of electrode shown in Figs. 8 to 12, inclusive, I prefer the frame A to be unprovided with the bars or partitions A', but to be a mere frame surrounding and supporting the edges of the body or wire portion B of the electrode, which is set into the grooved or flanged frame and united thereto, as before described. In this form of electrode the wire is interlaced or woven into a net or fabric of sieve-like form. When this sieve or net form of interlaced or woven wire is used, I employ several sheets or plates of the fabric set face to face, or with the broad sides of the sheets facing each other in the frame A, the ends of the wires being all united together by melting or soldering and to the frame, as before.

In Fig. 10 I have shown a perspective of this arrangement of interlaced or woven wire, and in Fig. 11 a sectional plan showing the sheets or plates of the netting slightly separated, while in Fig. 12 they are shown in contact with each other.

The frame A is preferably provided with an extended end or lug, $A^2$, for the circuit-connections, and this may be protected from the action of the battery fluid by being covered with rubber or some protective varnish, or in any other way, it being desirable to protect it, so as to avoid loss of conductivity due to injury inflicted by the action of the fluid.

My improved electrode may be used as above described, and is thus a modified or improved Planté element, offering very extensive surface, or I may coat, fill, or otherwise apply to the wires and in the surrounding frame an active material, or material to be made active—such as finely-divided lead oxide or peroxide of lead or other suitable matter—to increase the extent of surface or efficiency of the electrode. It is better in all cases not to apply the active material, or material to be made active, in such mass or quantity as to make the electrode or plate a solid one, and thereby prevent free circulation or access of the electrolyte to the interior of the element. When such active material, or material to be made active, is applied to the electrode and between the woven wire sheets or plates, it will be seen that it is securely held in place and prevented from dropping or falling out by the binding action of the wires.

Before reciting what I claim (and some of the improvements claimed by me may be used without the others) it is proper that I should acknowledge the prior state of the art. Lengths or strips of wire have been employed in connection with an open-sided frame, and, further, such wire has been crossed or diagonally arranged in such a frame, or in two frames placed together. So, also, a sheet or plate of interlaced or woven wire has been prior to my invention suggested in connection with a surrounding frame; but finely-divided active material applied thereto is insecurely held, and cannot be prevented from disengagement, while in addition such material has to be highly pressed upon the wire-support if the use of felt or some equivalent thereof is to be avoided. It has also been suggested to employ two or more sheets or plates of woven wire or network placed side by side with an intervening active layer or substance; but the manner of constructing such an electrode is defective, as the electrode is converted into a solid body by heavy pressure, and, further than this, there is no open-sided frame surrounding the edges of the wire sheets, as in my invention, which frame is a very important part of my improved electrode. The employment of several sheets or nets connected together throughout the body of the electrode has also been suggested; but in this case also there is no open-sided frame surrounding the edges of the body of the electrode, the importance of which has been before stated. So, also, wire twisted into a rope has been suggested for use in secondary batteries; but the construction is defective, as the inner parts of the strands making up the rope are practically unacted upon. Wire twisted into a rope or band has been employed in connection with a perforated plate or frame, the rope or band being bent upon itself repeatedly, and then placed sidewise relatively to said plate or frame, the ends or terminals of the two being connected together. All these forms of employing the wire are defective. In none of them is the wire so interlaced or woven and so organized as to attain the requisite strength and durability with economy of manufacture, and with the above to insure a free circulation of the battery fluid with the largest amount of active surface. By converting the wire into an open interlaced or woven fabric, setting or inserting sheets or strips thereof with their broad sides facing each other into a frame which surrounds the edges of the sheets or strips, and then firmly uniting the frame and wire fabric or sheets together at the edges thereof, I obtain an electrode which is decidedly superior to those of this type which existed before, and one which may be rapidly and comparatively cheaply made. As before stated, when the space between the sheets or strips is filled with finely-divided material, it is securely held and cannot escape, and at the same time the free access and circulation of the electrolyte is substantially unimpeded.

Having thus fully set forth my present improvements, I state my claim herein as follows:

1. An electrode having two or more sheets or strips of interlaced or woven wire placed with the broad sides of said sheets or strips facing each other, and surrounded at their edges and united thereat to an open-sided frame, substantially as described.

2. A secondary-battery electrode consisting of an open-sided frame having set therein layers or folds of woven or interlaced wire in the form of a flat plaited or braided strip or strips, said frame surrounding the edges of the plate formed by said folds or layers and being firmly united thereto, substantially as described.

In testimony whereof I have hereunto subscribed my name this 27th day of October, A. D. 1883.

ELI T. STARR.

Witnesses:
WM. J. PEYTON,
EUGENE V. BROWN.